United States Patent [19]
Vandervalk

[11] Patent Number: 5,813,616
[45] Date of Patent: Sep. 29, 1998

[54] BALE PROCESSOR

[75] Inventor: James Vandervalk, Fort Macleod, Canada

[73] Assignee: Fastec Manufacturing, Fort MacLeod, Canada

[21] Appl. No.: 759,090

[22] Filed: Nov. 29, 1996

[51] Int. Cl.[6] .......................... B02C 18/06; B02C 21/02
[52] U.S. Cl. .............. 241/101.76; 241/194; 241/605
[58] Field of Search ............................. 241/101.76, 194, 241/605, 185.5, 243

[56] References Cited

U.S. PATENT DOCUMENTS

| | | |
|---|---|---|
| 4,227,654 | 10/1980 | Seefeld et al. . |
| 4,420,119 | 12/1983 | Johnson . |
| 4,449,672 | 5/1984 | Morlock et al. . |
| 4,524,916 | 6/1985 | Keyes et al. . |
| 4,573,846 | 3/1986 | Willbanks et al. . |
| 4,597,703 | 7/1986 | Bartolini . |
| 4,657,191 | 4/1987 | Dwyer et al. . |
| 4,846,411 | 7/1989 | Herron et al. . |
| 5,033,683 | 7/1991 | Taylor . |
| 5,071,079 | 12/1991 | Fykse et al. .................. 241/605 X |
| 5,078,328 | 1/1992 | Willingham . |
| 5,090,630 | 2/1992 | Kopecky et al. . |
| 5,601,241 | 2/1997 | Brewster ...................... 241/101.76 |
| 5,622,323 | 4/1997 | Krueger et al. ................ 241/101.76 |

FOREIGN PATENT DOCUMENTS

1704694-A1  7/1989  U.S.S.R. .

Primary Examiner—John M. Husar
Attorney, Agent, or Firm—Ian Fincham

[57] ABSTRACT

The present invention discloses a bale processor for separating and selectively chopping baled crop materials. A moving barrier advances a bale into a separator which includes a rotating elongate tube provided with hinged finger-like flails. The flails remove material from the bale and discharge it in a directed manner. The material may be cut to differing sizes as desired by retractable knives positioned in the discharge outlet. Alternatively material can be separated without chopping. A second freely rotating blade separates material from the upper portion of the bale directing it into the path of the separator tube. The processor may be used to distribute crop material over a wide area mounted on a trailer and towed by a tractor. The apparatus advantageously can accommodate square or round bales employing a simple and economical bale handling mechanism.

15 Claims, 3 Drawing Sheets

BALE PROCESSOR

FIELD OF THE INVENTION

This invention relates to an apparatus for processing bales of crop material to separate and optionally cut up baled material to a selected size.

BACKGROUND OF THE INVENTION

Crop materials such as hay, silage, and straw or other materials are commonly stored in bales of various shapes held together by twine. The most common forms are circular and square bales, and these are very large and heavy bales, often more than 2000 pounds, requiring machinery such as forklifts and tractors to move them.

In order to make use of the baled material the bales must be separated. Given the size, weight and tight formation of these bales, it is not practical to do this by hand, and thus a number of devices have been proposed to separate the material automatically. Depending on the material baled, it may be desirable to process it differently. For instance, bedding straw is separated substantially whole to offer the most bulk, while feed materials are cut very finely for mixing with grain or more coarsely depending on the crop material. A further problem encountered in the art is that the bale may have become frozen during storage, increasing the difficulty and energy required to finely separate the material.

Further, it is desirable to distribute the large volume of material as it is separated. Placement of the separated material varies depending on the type material and its purpose. Hay or bedding may be broadcast over a wide area, while other feed material may be placed in a relatively small container for mixing with grain. It would be desirable to have an apparatus which would spread or place processed materials as appropriate.

Prior art arrangements which have been proposed to date include U.S. Pat. No. 5,090,630, issued to Kopecky et al. in 1992, which is typical of the art. This device drives a circular bale in rotation as it is exposed to a shredder mechanism. This method can only operate on the circular type bale, and the mechanization and the power demands to drive the large bale are significant.

Also typical of prior art bale processing designs is U.S. Pat. No. 5,033,683 issued to Taylor in 1991 which discloses a bale chopping device. This device separates material from a driven circular bale with a series of rotating blades to cut up the material as it is separated.

While numerous devices have been proposed to address specific tasks, none is available which offers the flexibility to separate without chopping the material or cut material to a desired size from any shape of bale and place the material appropriately.

SUMMARY OF THE INVENTION

It is an object of the present invention to provide an apparatus for automatically separating and selectively chopping baled material.

Another object of the present invention is to provide an apparatus for separating and selectively chopping a bale of crop material comprising:
  means for supporting at least one bale of crop material;
  an elongate rotatable member adjacent the means for supporting a bale;
  fingers on the rotatable member for separating crop material from the bale and expelling it from the apparatus;
  a discharge outlet for directing the expelled material;
  means to advance a bale relative to the rotatable member; and
  retractable cutting members for cooperation with the fingers to selectively chop the separated crop material.

A further object of the present invention is to provide an apparatus for separating and selectively chopping a bale of crop material, wherein the retractable cutting members comprise a series of regularly spaced knives arranged between the paths of the fingers projecting an adjustable height into the discharge outlet, whereby separated material is forced against the sharpened edge of the knives by the fingers and cut before passing through the discharge outlet.

A still further object of the present invention is to provide an apparatus for separating and selectively chopping a bale of crop material which further includes a deflector mounted above the elongated rotatable member having moveable blades on a freely rotating shaft for forcing upper portion of the bale material down to the rotatable member, and for preventing material from passing over the rotatable member.

The bale processor of the present invention includes a bale support surface adapted to accommodate square or round bales, which is carried on a wheeled trailer to permit distribution of the separated or chopped material. The apparatus is designed to be advanced by a prime mover especially a tractor which can also provide rotational drive from a power take-off and hydraulic motor. Of course, a stationary device provided with suitable drive motors may also be envisioned.

The support surface accommodates at least one bale advancing it towards the separator as material is removed. This may be a simple conveyor, or preferably a barrier which pushes the bale on a sliding surface toward the separator. Alternatively the separator may be advanced on tracks toward the bale. An inclined surface may assist in advancing the bale.

The separator is an elongate rotatable member at least as long as the width of the bales. It is supported on a frame by a central shaft which is driven for rotation at high speed, approximately 1000 rpm is preferred. Any suitable drive may be used, for example gears, chains or belts from the power take-off or the hydraulic drive of the tractor. A series of fingers or flails radiate from the central shaft. In a preferred construction the fingers are spaced regularly on an elongate tube surrounding the central shaft. The fingers are hingedly attached to the tube. When the shaft and surrounding tube are rotated they are extended radially. When the fingers contact the bale, material is drawn from it and expelled at high speed through a discharge outlet under the elongate tube. Because the fingers are broad spoon shaped members, material is separated from the bail without cutting it.

If it is desired to chop the separated material, a series of retractable knives are provided under the elongate tube in the discharge outlet. The knives are spaced between the fingers to cut the separated material as it is drawn by the fingers through the discharge outlet. The height of the knives is adjustable providing a selection between finely cut material and irregularly or more coarsely cut material.

Material separated or chopped by the separator is expelled at high speed through the discharge outlet. For distributing the material widely, the discharge outlet is unobstructed, and straw can be spread over a 50 foot area. To place the material in a more controlled area, a deflector gate is provided adjacent the discharge spout. The deflector gate is hinged, and the angle can be adjusted by a simple support arm to direct the output downward toward a desired location.

Material is drawn from the bottom of the bale. As a result in prior art devices material from the top of the bale has been able to pass over the separator in heavy chunks. This is particularly a problem if the bale is frozen. To correct this problem, a deflector is provided above the separator to force material from the top of the bale down to the separator. In a preferred construction the deflector is a freely rotating elongate wheel having a series of paddle blades. Rotation of the deflector may also be driven by an appropriate power source. The blades flake off pieces of bake material and direct them into the separator. If the blades are not the full width of the bale smaller pieces can be removed more effectively, especially from frozen bales.

The present bale processor is adapted to be used with both square and round bales without complicated bale supporting or rotating mechanisms. Due to its relatively simple design the present invention is not fouled by baling cord, and bales may be processed without first removing the cord. Although it is recommended that a build-up of cord is periodically removed. A further advantage of the present invention is its ability to selectively separate or chop the baled material, and particularly to permit control of the size of chopped material.

Having thus generally described the invention, reference will now be made to the accompanying drawings illustrating preferred embodiments in which like numerals are used to designate like elements.

DETAILED DESCRIPTION OF THE PREFERRED EMBODIMENTS

Figure 1:
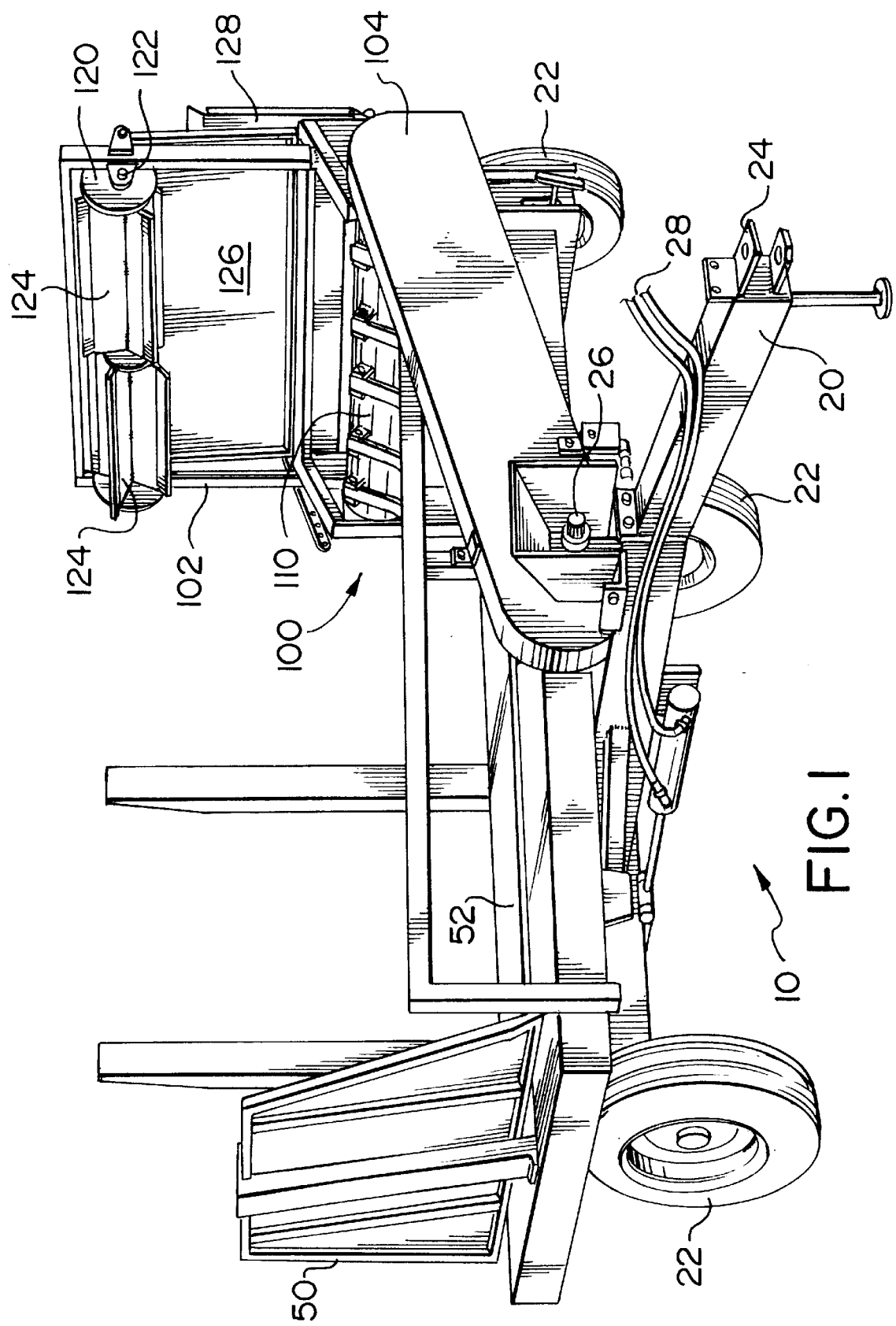
FIG. 1 is a side elevational view of a preferred embodiment of the present invention, illustrating the deflector gate in an open position.

Referring to FIG. 1, the bale processor is shown generally a 10. A trailer carriage 20 supported on wheels 22 includes a hitch 24 for connection to a tractor (not shown). Operative connection to the pto drive of the tractor is provided through the pto coupling 26 for driving the separator, shown generally at 100. A further hydraulic coupling 28 is provided for driving the advancing barrier 50.

A support surface 52 rests on the trailer carriage 20 for receiving at least one bale. A slot 54 (seen clearly in FIG. 2) serves to communicate the drive to the advancing barrier 50. This barrier 50 pushes the bale(s) toward the separator 100, continuously advancing the bale as material is removed.

The separator 100 is positioned at one side of the trailer carriage 20, for distribution of material from the rear as the tractor and assembly are advanced, the assembly may be configured in a position rotated 90 degrees to that shown. The separator 100 includes a support frame 102 on which the flail tube 110, an elongate rotatable member is rotatably mounted. Rotation is provided through the shielded drive means 104, preferably by chain or gear linkage from the power take-off 26. Rotatably mounted above the flail tube 110, is the deflaker 120, an elongate wheel freely rotating in bearings 122. The deflaker 120 includes a series of paddle type blades 124. The blades 124 are offset. As illustrated each blade 124 is one half the length of the deflaker 120.

The flail tube 110 is mounted with a series of fingers or flails 112 which are hingedly mounted on the surface of the tube 110 by a hinge pin 113 in a welded clevis 114. The flails 112 may be arranged in different patterns across the length of the tube 110 as appropriate to the baled material. Between the support surface 52 and the flail tube 110 is defined a discharge outlet 130 through which separated material is expelled. Within the discharge outlet 130 is a series of retractable knives 132 which are positioned between the paths of the rotating flails 112. Each knife has a sharpened edge 133 directed against the direction of feed indicated by the arrow A.

Figure 2:
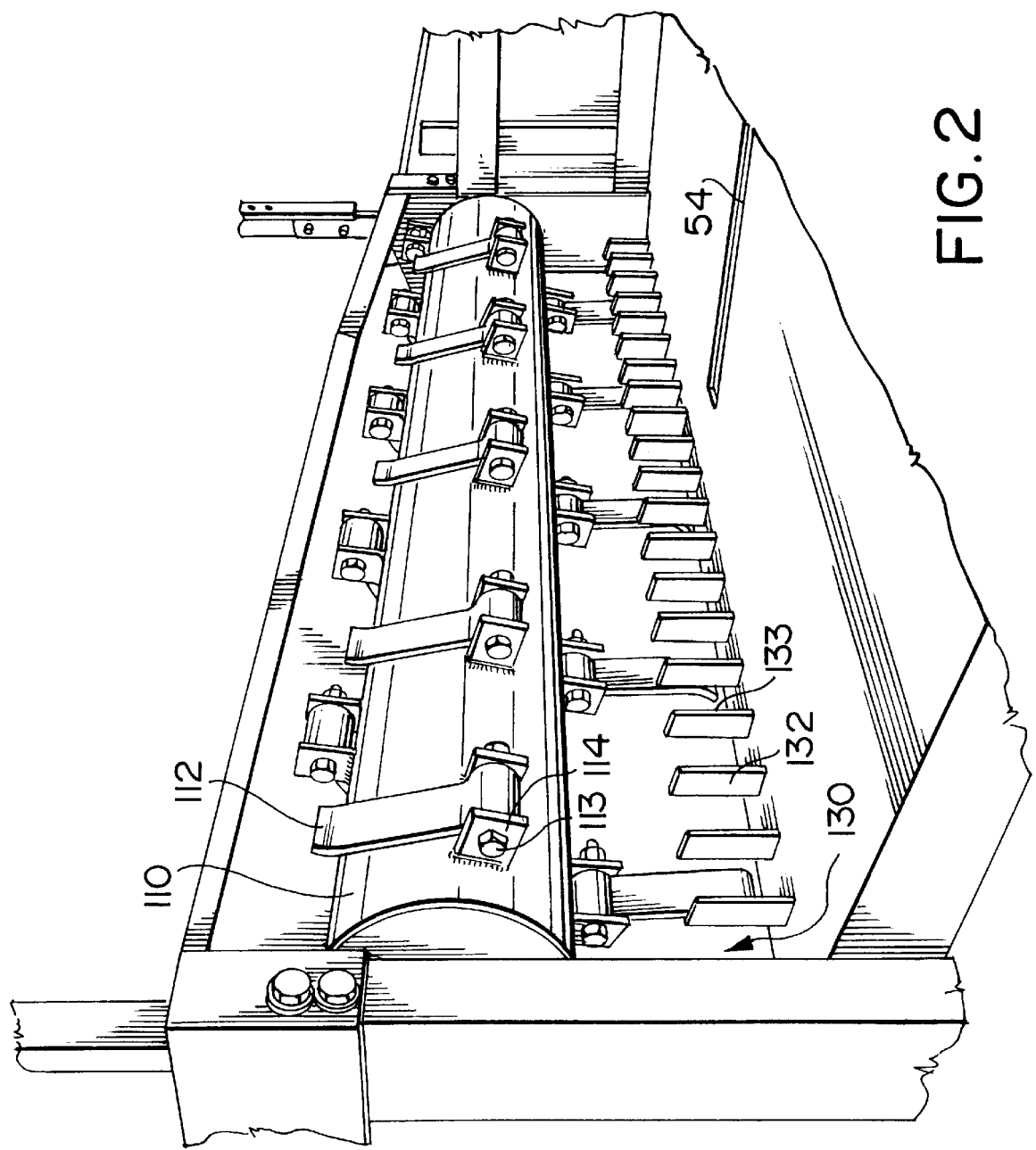
FIG. 2 is a partial view illustrating the feed side of the separator of the embodiment of FIG. 1 showing the knives in a fully extended position.
Figure 3:
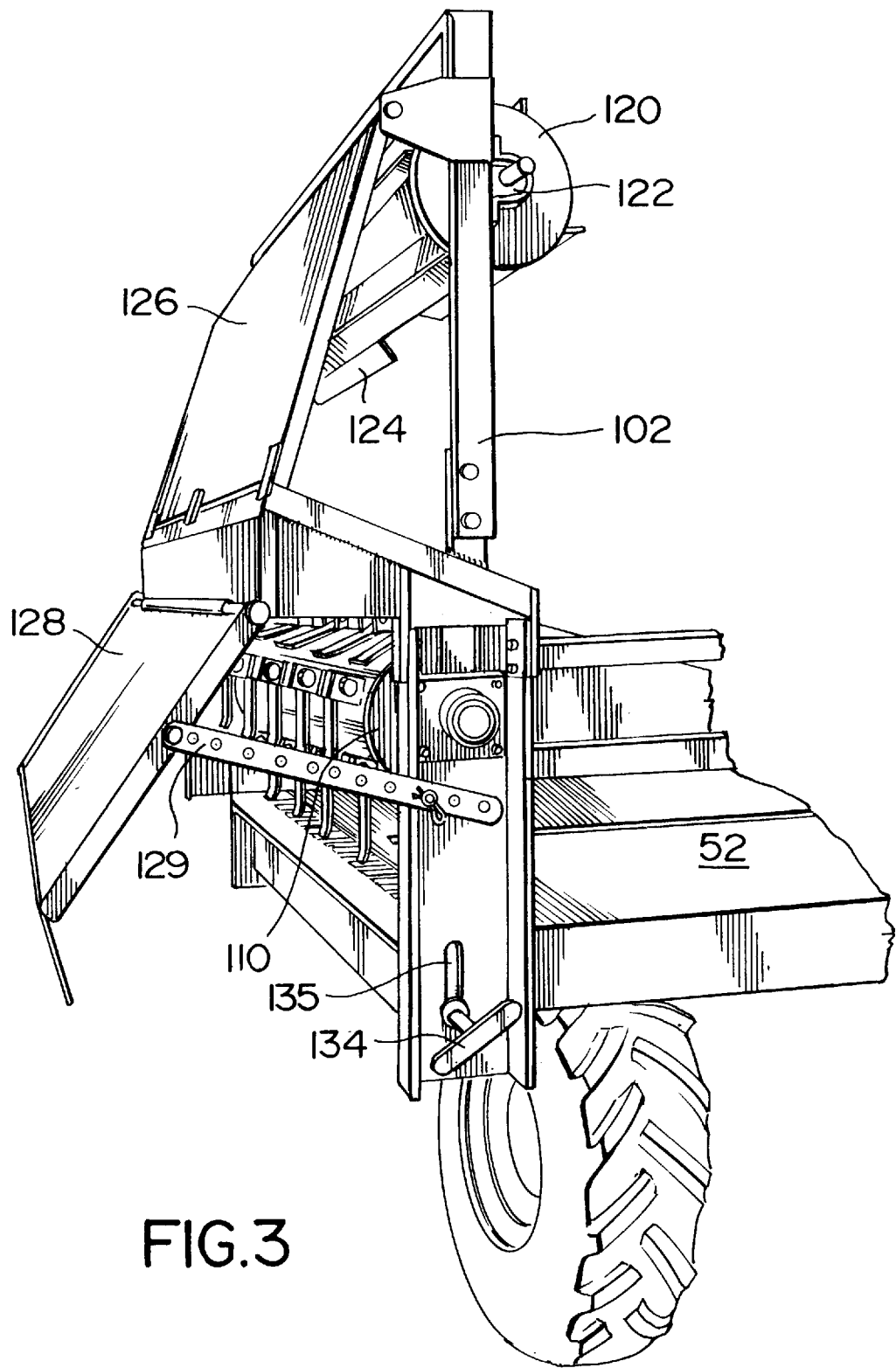
FIG. 3 is partial side elevational view of the discharge side of the separator of the embodiment of FIG. 1 showing the deflector gate in an intermediate position.

Referring now to FIG. 3, the deflaker 120 is illustrated with the deflector shield 126 and the hinged deflector gate 128. The deflector gate 128 may be fully opened as illustrated in FIG. 2, or adjustably lowered on support arms 129 to control the expelled material. Also visible is the handle 134 which is engaged to a lift bar (not shown) supporting the knives 132. By releasing tension on a threaded engagement the height of the lift bar can adjusted within the slot 135 which raises or lowers the height of the knives 132 within the discharge outlet 130.

In operation a bale is positioned on the support surface 52 in front of the barrier 50 by a lift, either incorporated in the apparatus, or a separate lift. The hydraulic drive 28 advances the barrier 50 along the slot 54 sliding the bale into the separator 100. The flail tube 110 is rotating driven by the pro drive 26 at approximately 1000 rpm causing the flails 112 to extend radially from the tube 110. As the flails 112 contact the bale, material is drawing away and expelled downward through the discharge outlet.

As the bale advances, the upper portion of the bale contacts the deflaker blades 124. Pressure against the blades 124 causes the deflaker 120 to rotate and to remove chunks or flakes of the bale material. The blades 124 are shorter than the width of the bale and offset side by side, so that a smaller bite is taken by each blade 124. The flakes removed fall down to the flail tube 110 below. The deflector 126 prevents material from passing over the flail tube 100. In an alternative embodiment the deflaker 120 may be driven in tandem with the flail tube 110 with step downs for the rotation speed as appropriate.

If it is desired to broadcast the separated material over a wide area, deflector gate 128 will be opened and latched against the deflector 126. Separated material is expelled at high speed through the discharge outlet 130, while simultaneously the entire assembly may be advanced by the tractor if desired. To limit the area material is distributed to, the deflector gate 128 is lowered to an appropriate angle on support arm 129. A simple series of holes and cotter pin serve to maintain the position.

The flails 112 serve to separate the material without cutting it. To chop material the knives 132 are raised in the discharge outlet 130. The height is adjustable to cut all of the material finely or to permit differing amounts to pass over the blades 132 uncut. An appropriate maximum height for the knives 132 has been found to be approximately 3½", while the minimum height is flush with the support surface 52. As the flails 112 draw material from the bale it is advanced by the flail 112 against the sharp leading edge 133 of the knives 132. The knives 132 are positioned in between the rotational path of the flails 112. Alternatively, the knives 132 may be raised in series depending on the desired size, every blade raised for the finest cut, every two or every three blades for a coarser cut.

It will be apparent that many other changes may be made to the preferred embodiments, while falling within the scope of the invention and it is intended that all such changes be encompassed in the following claims.

I claim:

1. An apparatus for separating and selectively chopping a bale of crop material comprising:

means for supporting at least one bale of crop material;

an elongate rotatable member adjacent the means for supporting a bale;

fingers on the rotatable member for separating and drawing crop material from the bale and expelling it from the apparatus;

a discharge outlet for directing the expelled material;

means to advance a bale relative to the rotatable member;

retractable cutting members for cooperation with the fingers to selectively chop the separated crop material; and means for adjusting the height of retractable cutting members.

2. An apparatus as defined in claim 1, wherein the retractable cutting members comprise a series of regularly spaced knives arranged between the paths of the fingers projecting into the discharge outlet, whereby separated material is forced against the sharpened edge of the knives by the fingers and cut before passing through the discharge outlet.

3. An apparatus as defined in claim 2, wherein the height of the knives projecting into the discharge outlet is adjustable from a position where the discharge outlet is unobstructed to a position substantially the full height of the discharge outlet.

4. An apparatus as defined in claim 3, wherein a threaded lift bar is provided for adjusting the height of the knives.

5. An apparatus as defined in claim 1, wherein the apparatus is further provided with a deflector above the rotatable member for forcing upper portions of the bale material down to the rotatable member, and for preventing material from passing over the rotatable member.

6. An apparatus as defined in claim 5, wherein the deflector includes moveable blades for flaking off portions of bale material.

7. An apparatus as defined in claim 6, wherein the moveable blades are provided on a freely rotating shaft.

8. An apparatus as defined in claim 6, wherein the moveable blades comprise paddles of a freely rotatable elongate wheel.

9. An apparatus as defined in claim 8, wherein the paddles are partial length of the elongate wheel and offset along the length of the elongate wheel.

10. An apparatus as defined in claim 8, wherein the elongate wheel is provided with rotational drive means.

11. An apparatus as defined in claim 9, further including an adjustable outlet guide for directing the expelled material.

12. An apparatus as defined in claim 11, wherein the adjustable outlet guide comprises a hinged deflector gate with adjustable length support arms to determine the angle of the deflector gate in cooperation with the discharge outlet.

13. An apparatus as defined in claim 1, wherein a wheeled frame adapted for movement across the ground is provided to support the apparatus.

14. An apparatus as defined in claim 1, wherein a smooth surface is provided to support at least one bale of crop material having a groove operatively connecting an advancing barrier to a chain drive for slidingly advancing a bale toward the rotatable member.

15. An apparatus as defined in claim 14, wherein the smooth surface is inclined away from the elongate rotatable member to provide a gravitational assist in advancing a bale of crop material.

* * * * *